United States Patent
Gandhi et al.

(10) Patent No.: US 10,789,058 B2
(45) Date of Patent: Sep. 29, 2020

(54) EXTENSIBILITY OF UNIFIED PLATFORM

(71) Applicant: Microsoft Technology Licensing, LLC, Redmond, WA (US)

(72) Inventors: Viraf Rusi Gandhi, Redmond, WA (US); Doron Joseph Holan, Mercer Island, WA (US); Zachary A. Lockard, Woodinville, WA (US); Matthew John Montera, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/256,283

(22) Filed: Jan. 24, 2019

(65) Prior Publication Data
US 2019/0369978 A1   Dec. 5, 2019

Related U.S. Application Data

(60) Provisional application No. 62/678,174, filed on May 30, 2018.

(51) Int. Cl.
| | | |
|---|---|---|
| *G06F 9/44* | (2018.01) | |
| *G06F 11/07* | (2006.01) | |
| (Continued) | | |

(52) U.S. Cl.
CPC ............ *G06F 8/61* (2013.01); *G06F 8/65* (2013.01); *G06F 9/3017* (2013.01);
(Continued)

(58) Field of Classification Search
CPC .... G06F 21/53; G06F 21/6209; G06F 21/604; G06F 8/65; G06F 8/54; G06F 8/60;
(Continued)

(56) References Cited

U.S. PATENT DOCUMENTS

| | | | | |
|---|---|---|---|---|
| 6,535,998 B1 * | 3/2003 | Cabrera | ............ | G06F 11/1415 714/15 |
| 6,820,214 B1 * | 11/2004 | Cabrera | ............ | G06F 11/1469 714/15 |

(Continued)

OTHER PUBLICATIONS

Hyung Jin Kim et al., Third-party mobile app developers' continued participation in platform-centric ecosystems: An empirical investigation of two different mechanisms, 2015, [Retrieved on May 7, 2020]. Retrieved from the internet: <URL: https://pdf.sciencedirectassets.com/main.pdf?> 16 Pages (44-59) (Year: 2015).*

(Continued)

*Primary Examiner* — Anibal Rivera
(74) *Attorney, Agent, or Firm* — Newport IP, LLC; Michael C. Johnson; Han Gim

(57) ABSTRACT

Interfaces are provided for receiving software development kit runtime binaries configured for a standardized platform; receiving a driver framework package that is generated based on the software development kit and configured to enable extensibility under a set of constraints; and interacting with first party frameworks and allowing third party frameworks to access the software development kit runtime binaries and allow applications to use the third party frameworks.

20 Claims, 6 Drawing Sheets

(51) Int. Cl.
- *G06F 21/57* (2013.01)
- *G06F 8/61* (2018.01)
- *G06F 9/30* (2018.01)
- *G06F 8/65* (2018.01)
- *G06F 9/445* (2018.01)
- *G06F 8/41* (2018.01)
- *G06F 9/4401* (2018.01)
- *G06F 9/455* (2018.01)

(52) U.S. Cl.
CPC ............ *G06F 9/44505* (2013.01); *G06F 8/41* (2013.01); *G06F 8/47* (2013.01); *G06F 8/63* (2013.01); *G06F 9/4411* (2013.01); *G06F 9/45504* (2013.01); *G06F 21/572* (2013.01)

(58) Field of Classification Search
CPC .... G06F 8/61; G06F 11/3668; G06F 11/1417; G06F 11/1415; G06F 11/1469; G06F 9/468; G06F 9/45516; G06F 17/2247; G06F 21/572; G06F 21/552; G06F 21/00; G06F 8/63; G06F 8/47; G06F 8/315; G06F 8/41; G06F 9/4411; G06F 9/541; G06F 9/45504; G06F 3/3017; G06F 9/44505

See application file for complete search history.

(56) References Cited

U.S. PATENT DOCUMENTS

| | | | |
|---|---|---|---|
| 6,825,941 B1* | 11/2004 | Nguyen | G06F 3/1227 358/1.13 |
| 6,851,073 B1* | 2/2005 | Cabrera | G06F 11/1417 714/15 |
| 7,024,666 B1* | 4/2006 | Brown | G06F 8/47 700/246 |
| 7,467,392 B1* | 12/2008 | Ludwig | G06F 9/4411 710/19 |
| 8,291,490 B1* | 10/2012 | Ahmed | G06F 21/604 726/17 |
| 8,321,921 B1* | 11/2012 | Ahmed | G06F 21/00 726/5 |
| 8,706,800 B1* | 4/2014 | Ahmed | G06F 9/468 709/201 |
| 8,849,968 B2* | 9/2014 | Hunt | G06F 21/53 709/223 |
| 9,146,829 B1* | 9/2015 | Allen | G06F 11/3668 |
| 9,250,882 B2* | 2/2016 | Piunno | G06F 8/54 |
| 9,648,581 B1* | 5/2017 | Vaynblat | G06Q 30/0261 |
| 9,703,680 B1* | 7/2017 | Chang | G06F 8/60 |
| 9,841,969 B2* | 12/2017 | Seibert, Jr. | G06F 8/65 |
| 9,915,934 B2* | 3/2018 | Brown | G06F 9/541 |
| 10,042,684 B2* | 8/2018 | Cook | G06F 16/2228 |
| 10,091,380 B1* | 10/2018 | Robertson | H04N 1/00938 |
| 2005/0097133 A1* | 5/2005 | Pham | G06F 8/61 |
| 2006/0121853 A1* | 6/2006 | Madhavan | H04L 1/0001 455/63.1 |
| 2007/0162487 A1* | 7/2007 | Frailey | H04N 7/165 |
| 2010/0131530 A1* | 5/2010 | Gibson | G06F 16/9038 707/758 |
| 2010/0198730 A1* | 8/2010 | Ahmed | G06F 21/6209 705/50 |
| 2012/0166276 A1* | 6/2012 | Chitnis | G06Q 30/0251 705/14.49 |
| 2013/0117356 A1* | 5/2013 | Oguma | G06F 8/30 709/203 |
| 2013/0138718 A1* | 5/2013 | Mallur | H04L 41/0803 709/203 |
| 2013/0138783 A1* | 5/2013 | Mallur | G06F 8/65 709/221 |
| 2013/0139183 A1* | 5/2013 | Mallur | G06F 8/63 719/321 |
| 2013/0151736 A1* | 6/2013 | Lenart | G06F 9/4411 710/10 |
| 2013/0276146 A1* | 10/2013 | Gilani | H04L 63/10 726/29 |
| 2013/0283380 A1* | 10/2013 | Thadikaran | G06F 21/554 726/23 |
| 2013/0295847 A1* | 11/2013 | Renard | G06Q 20/38215 455/41.1 |
| 2013/0332363 A1* | 12/2013 | Renard | H04B 5/0031 705/44 |
| 2014/0228074 A1* | 8/2014 | Kulkarni | H04M 1/72527 455/557 |
| 2015/0135170 A1* | 5/2015 | Murray | G06F 9/44536 717/148 |
| 2015/0186123 A1* | 7/2015 | Piunno | G06Q 30/00 717/163 |
| 2015/0347107 A1* | 12/2015 | Munshi | G06F 8/47 717/147 |
| 2016/0134737 A1* | 5/2016 | Pulletikurty | G06F 3/0227 715/735 |
| 2016/0306978 A1* | 10/2016 | Thadikaran | G06F 12/1466 |
| 2016/0337426 A1* | 11/2016 | Shribman | H04L 65/608 |
| 2017/0052835 A1* | 2/2017 | Cook | H04L 63/145 |
| 2017/0060568 A1* | 3/2017 | Seibert, Jr. | G06F 8/65 |
| 2017/0109391 A1* | 4/2017 | Rosen | G06F 16/2291 |
| 2017/0118267 A1* | 4/2017 | Philippov | H04L 67/16 |
| 2017/0206707 A1* | 7/2017 | Guay | G06F 16/2246 |
| 2017/0286261 A1* | 10/2017 | Li | G06F 9/44526 |
| 2017/0372180 A1* | 12/2017 | Li | G06Q 20/353 |
| 2018/0052723 A1 | 2/2018 | Yim et al. | |
| 2018/0225230 A1* | 8/2018 | Litichever | G06F 21/82 |
| 2019/0068622 A1* | 2/2019 | Lin | G06F 9/45558 |
| 2019/0121682 A1* | 4/2019 | Adiletta | G06F 9/452 |
| 2020/0034062 A1* | 1/2020 | Gill | G06F 3/0659 |

OTHER PUBLICATIONS

Nektarios Papadopoulos et al., A Connected Home Platform and Development Framework for Smart Home Control Applications, IEEE 2009, [Retrieved on Nov. 22, 2016]. Retrieved from the internet: <URL: https://ieeexplore.ieee.org/stamp/stamp.jsp?tp=&arnumber=5195838> 8 Pages (402-409) (Year: 2009).*

"Container Security in Microsoft Azure", In White Paper of Microsoft Corporation, Aug. 2018, 21 Pages.

"Hardware Support App (HSA): Steps for App Developers", Retrieved From: https://docs.microsoft.com/en-us/windows-hardware/drivers/devapps/hardware-support-app--hsa-steps-for-app-developers, Aug. 16, 2017, 7 Pages.

Clover, Juli, "All New Apps Must Be Built With iOS 11 SDK Starting in April", Retrieved From: https://www.macrumors.com/2018/02/15/new-apps-ios-11-sdk-april/, Feb. 15, 2018,15 Pages.

Hudek, et al., "Getting Started with Universal Windows drivers", Retrieved From: https://docs.microsoft.com/en-us/windows-hardware/drivers/develop/getting-started-with-universal-drivers, Apr. 20, 2018, 3 Pages.

Hudek, et al., "INF AddSoftware Directive", Retrieved From: https://docs.microsoft.com/en-us/windows-hardware/drivers/install/inf-addsoftware-directive, Aug. 7, 2018, 6 Pages.

Hughes, et al., "uap5:DriverDependency", Retrieved From: https://docs.microsoft.com/en-us/uwp/schemas/appxpackage/uapmanifestschema/element-uap5-driverdependency, Oct. 10, 2017, 3 Pages.

Malatpure, et al., "Cloud Validation as a Service", Application as filed in U.S. Appl. No. 15/865,235, filed Jan. 8, 2018, 86 Pages.

Robertson, et al., "Delay (Delay Load Import Settings)", Retrieved from: https://docs.microsoft.com/en-us/cpp/build/reference/delay-delay-load-import-settings?view=vs-2017, Nov. 4, 2016, 2 Pages.

"International Search Report and Written Opinion Issued in PCT Patent Application No. PCT/US19/031946", dated Aug. 19, 2019, 13 Pages.

* cited by examiner

EXTENSIBILITY OF UNIFIED PLATFORM

PRIORITY APPLICATION

This application claims the benefit of and priority to U.S. Provisional Application No. 62/678,174, filed May 30, 2018, the entire contents of which are incorporated herein by reference.

BACKGROUND

Computing devices today have an increasing number of attached and installed peripheral devices. In order to interface to such peripherals, the computing device typically runs a device driver to operate or control each type of device. Drivers are programs that can extend an operating system to enable support for devices that the operating system does not natively support. Drivers are tightly integrated with the operating system upon which they execute. For example, drivers typically share the same address space as the operating system and use the same primitives as the operating system. Each driver therefore, like any other part of an operating system, can affect an entire computing device and user experience. For example, when a kernel crashes, all the other programs executing on the host computing device will also typically crash.

Driver development typically address a number of issues that may make it difficult to develop drivers that execute reliably and performantly. Furthermore, some drivers may face sediment issues where the driver is not upgradeable.

It is with respect to these and other technical challenges that the disclosure made herein is presented.

SUMMARY

Techniques are disclosed for facilitating the creation and execution of drivers and other applications in a scalable manner. In various embodiments, a framework is described that enables development, packaging, and distribution of hardware provider software development kit (SDK) runtime binaries. In one embodiment, a driver framework package (DFP) is disclosed that enabled access to the SDKs and other applications using defined interfaces. A driver framework package may be a type of package for hardware provider SDKs which operate and are published via an application repository or store (which may generally be referred to herein as the "store"). The driver framework package may be configured to enable flexible hardware provider extensibility in a manner that also provides security, long term performance, and reliability in drivers and applications.

The framework disclosed herein allows for the separation of the extensibility portion of a driver from the rest of the driver so that they both can be updated independently. With this model, the framework can be accessible via the store and the benefits of store applications can be made applicable to other frameworks. The framework can increase the reliability and performance of drivers and applications by enabling development of drivers and applications using standard interfaces. More reliable and performant drivers and applications may, in turn, result in better performing computing devices that utilize fewer processor cycles, less memory, and less power. Other technical benefits not specifically mentioned herein can also be realized through implementations of the disclosed subject matter.

A development environment, such as for an operating system, may implement a platform, such as the Universal Windows Platform (UWP), that exposes an application programming interface (API) to facilitate development of universal applications that can run on multiple types of devices. In some scenarios, the universal applications may be configured to run in a container or other package for containing code and its dependencies through defined channels. However, applications running in containers may not be able to access hardware components. For example, drivers and SDKs may be written to a location that is not accessible via the platform. A dynamic link library (DLL) for a driver, for example, may be written to an area that is not accessible via the platform. In an embodiment, the driver framework package may be published through the store/repository and may be configured to allow accessibility to applications. In this way, universal applications may access third party delivered frameworks via the store.

In order to realize some or all of the technical benefits mentioned above, the framework disclosed herein enables the creation and execution of SDKs that are compatible with the framework via the store. The framework can execute in conjunction with execution of an operating system. The functionality provided by the framework might also be incorporated directly into an operating system in some implementations.

By updating the driver development ecosystem to implement driver design principles and driving componentization of the framework outside of the driver package so that it can be updated independently and delivered via the store, a more secure update experience may be provided while allowing the system provider to keep their systems current in terms of the latest operating system and drivers. In an embodiment, drivers and other applications may conform to the framework by causing the applications to run in the containers and requiring adherence to a set of constraints that restrict behaviors that may cause system issues such as a system failure. Furthermore, the constraints may allow the applications to be consistently updatable, ensure that the application are at an expected location and that expected files and binaries are in expected locations, and are easy to upgrade.

As discussed, one issue when applications run in a container is that they may not be able to communicate directly to driver binaries. Publishing SDK binaries as frameworks allows applications to declare them as an optional dependency so that the frameworks can be used if available. An SDK may be a library of tools that a hardware provider may publish that defines how to communicate to their components. In an embodiment, the driver framework package may include the SDK, allowing it to be accessible to store applications. In one embodiment, the driver framework package may be used to enable communication via the application store that is configured to provide a standard interface between drivers/applications, hardware components, and other parties. A driver framework package, for example, may be a store entity that is published through the store, and any driver or application using the framework may communicate to the driver framework package. The driver framework package can communicate to system software using prescribed methods. In this way, applications using the framework may have access to SDKs in a way that is scalable.

In one embodiment, the store may be configured to implement a middle layer that exposes interfaces to the SDKs and first party frameworks, thus allowing third party frameworks to access the SDKs and allow framework applications to use those third party frameworks. Thus a driver may trigger installation of a framework in the store, after which the framework application can leverage the third party framework as it does first party frameworks. In this way, extensions to operating systems may be implemented in a controlled way that adheres to a set of criteria. Furthermore, frameworks need only be installed if the associated hardware is present in a particular system, rather than having the associated application run regardless of whether the associated framework is installed.

It should be appreciated that the above-described subject matter can be implemented as a computer-controlled apparatus, a computer-implemented method, a computing device, or as an article of manufacture such as a computer readable medium. These and various other features will be apparent from a reading of the following Detailed Description and a review of the associated drawings.

This Summary is provided to introduce a brief description of some aspects of the disclosed technologies in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
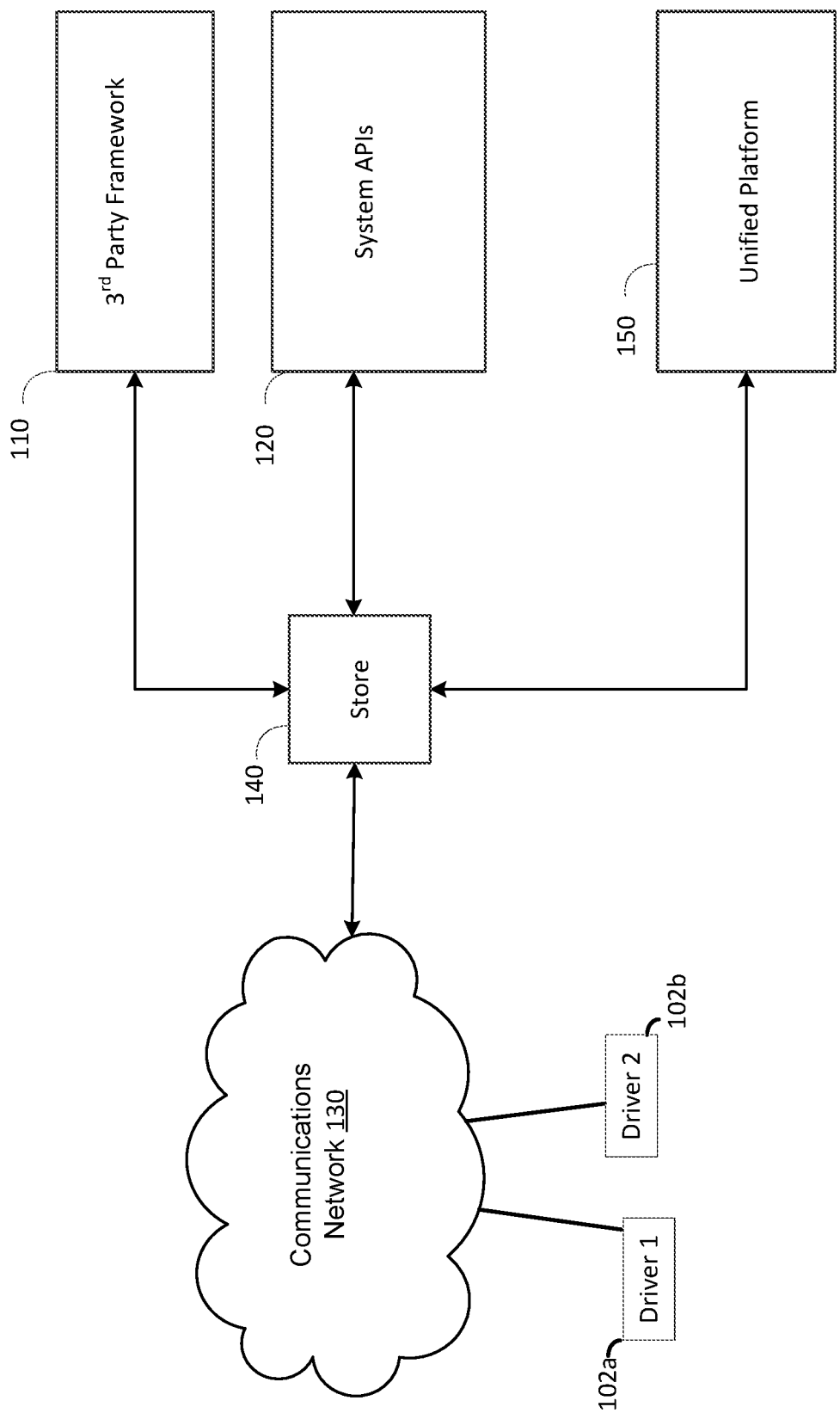
FIG. 1 is a computer software architecture diagram that shows aspects of a framework as disclosed herein.

The following detailed description is directed to a framework that can enable the creation and execution of drivers and applications and associated SDKs. While the subject matter described herein is presented in the general context of a driver and application framework and an operating system, those skilled in the art will recognize that other implementations might be performed in combination with other types of computing systems and applications. Those skilled in the art will also appreciate that the subject matter described herein can be practiced with other computer system configurations, including hand-held devices, multiprocessor systems, microprocessor-based or programmable consumer electronics, computing or processing systems embedded in devices (such as wearable computing devices, automobiles, home automation etc.), minicomputers, mainframe computers, and the like.

In the following detailed description, references are made to the accompanying drawings that form a part hereof, and which are shown by way of illustration specific configurations or examples. Referring now to the drawings, in which like numerals represent like elements throughout the several FIGS., aspects of a framework that can enable the creation and execution of reliable and efficient drivers and applications and associated SDKs will be described.

FIG. 1 illustrates an example computing environment in which the embodiments described herein may be implemented. FIG. 1 illustrates drivers 102a and 102b (which may be referred herein singularly as "a driver 102" or in the plural as "the drivers 102"). The drivers may be transmitted via a communications network 130 to store 140. Store 140 may further expose interfaces to third party entities 110, system APIs 120 (such as Win32), and a unified platform 150. Communications network 130 may, for example, be a publicly accessible network of linked networks and may be operated by various entities, such as the Internet. In other embodiments, communications network 130 may be a private network, such as a corporate network that is wholly or partially inaccessible to the public. Third party entities 110 may execute one or more computing devices.

The particular implementation of the technologies disclosed herein is a matter of choice dependent on the performance and other requirements of the computing device. Accordingly, the logical operations described herein are referred to variously as states, operations, structural devices, acts, or modules. These states, operations, structural devices, acts and modules can be implemented in hardware, software, firmware, in special-purpose digital logic, and any combination thereof. It should be appreciated that more or fewer operations can be performed than shown in the FIGS. and described herein. These operations can also be performed in a different order than those described herein.

Figure 3:
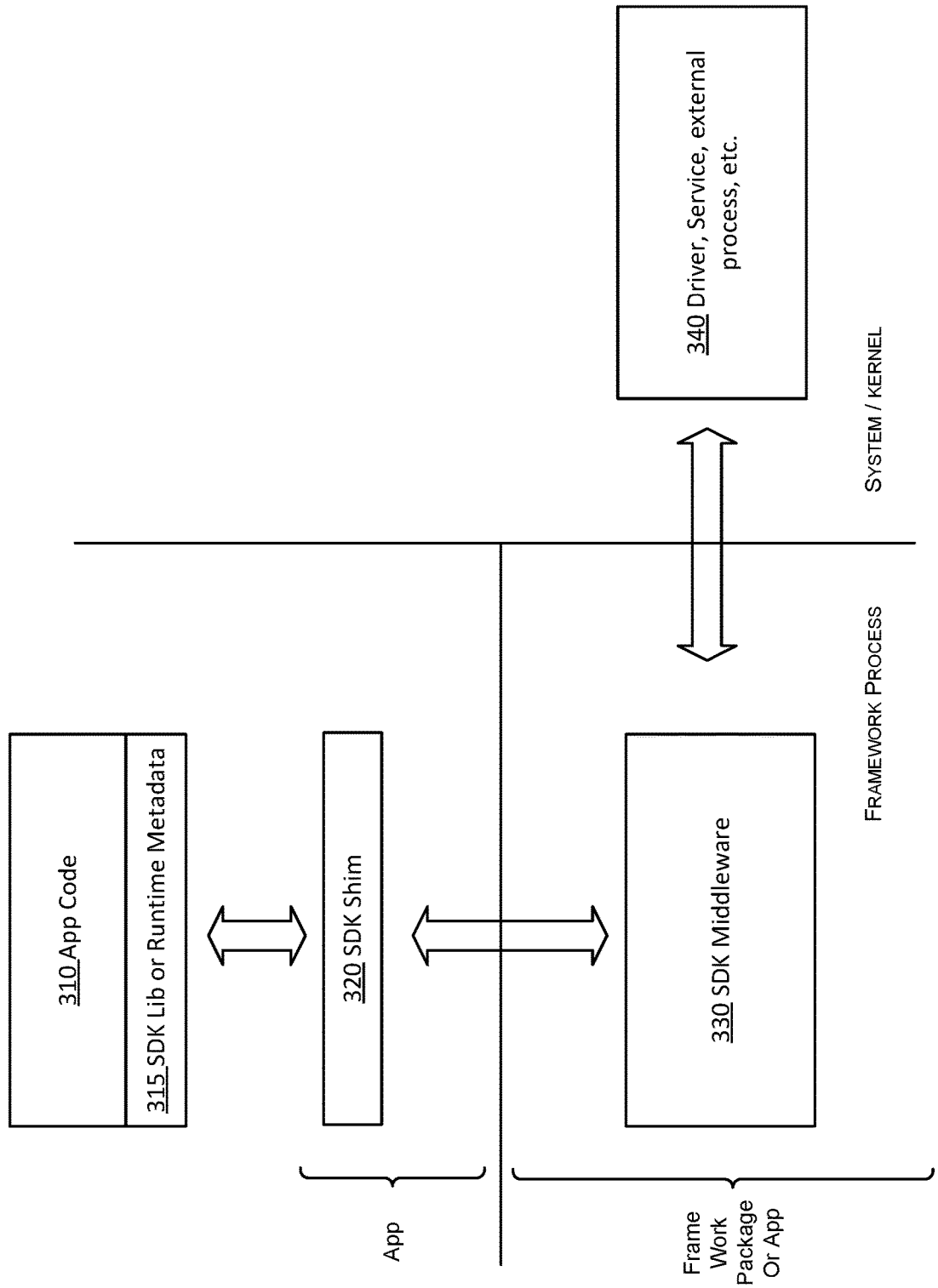
FIG. 3 is a diagram showing aspects of an SDK and framework as disclosed herein.

Described herein are mechanisms for developing, packaging, and distributing hardware provider SDK runtime binaries for a universal platform that is implemented via a store. An SDK may provide one or more services, functions, content, or capabilities that can be requested by a software application which the SDK is installed. In some embodiments, a driver framework package (DFP) may be implemented, which may be a type of store package generated for provider SDKs. The DFP may be configured to enable flexible extensibility by the providers in a manner that adheres to criteria established by the system provider. For example, criteria may be implemented to provide security, performance, and reliability. FIG. 3 is a diagram showing aspects of an SDK and UWP in some embodiments. Application code 310 may be independent software vendor (ISV) code that is verified to be compatible with the store or repository. Such code may be referred to herein as store compliant or simply as compliant. The ISV may develop code against an API that is defined by the SDK headers and import the SDK library or via the runtime metadata 315. The application does not perform any platform checks (ARM vs. x86, etc.) and is able to gracefully handle failures. The SDK Library or Runtime metadata 315 and SDK Shim DLL 320 may be IHV application code and may be store compliant.

The ISV may link directly to the SDK Shim DLL 320 via the SDK library or uses the runtime to indirectly load runtime classes. No delay-load declarations are required. The SDK Shim DLL 320 may be a thin forwarder/translator API. It may delay-load the SDK middleware DLL and may fail gracefully when it is not found. This may be within the application package graph so these calls are not verified to be store compliant.

The SDK Middleware DLL 330 may use RPC, input/output control codes (IOCTLs), or APIs to communicate to driver components. These APIs may be store compliant so no additions are needed. The SDK middleware DLL 330 may be IHV framework package code and may be store compliant.

The driver, service, external process 340 may be IHV platform code that is not store compliant. There may be a store boundary check between the SDK middleware DLL 330 and driver, service, external process 340.

Figure 2:
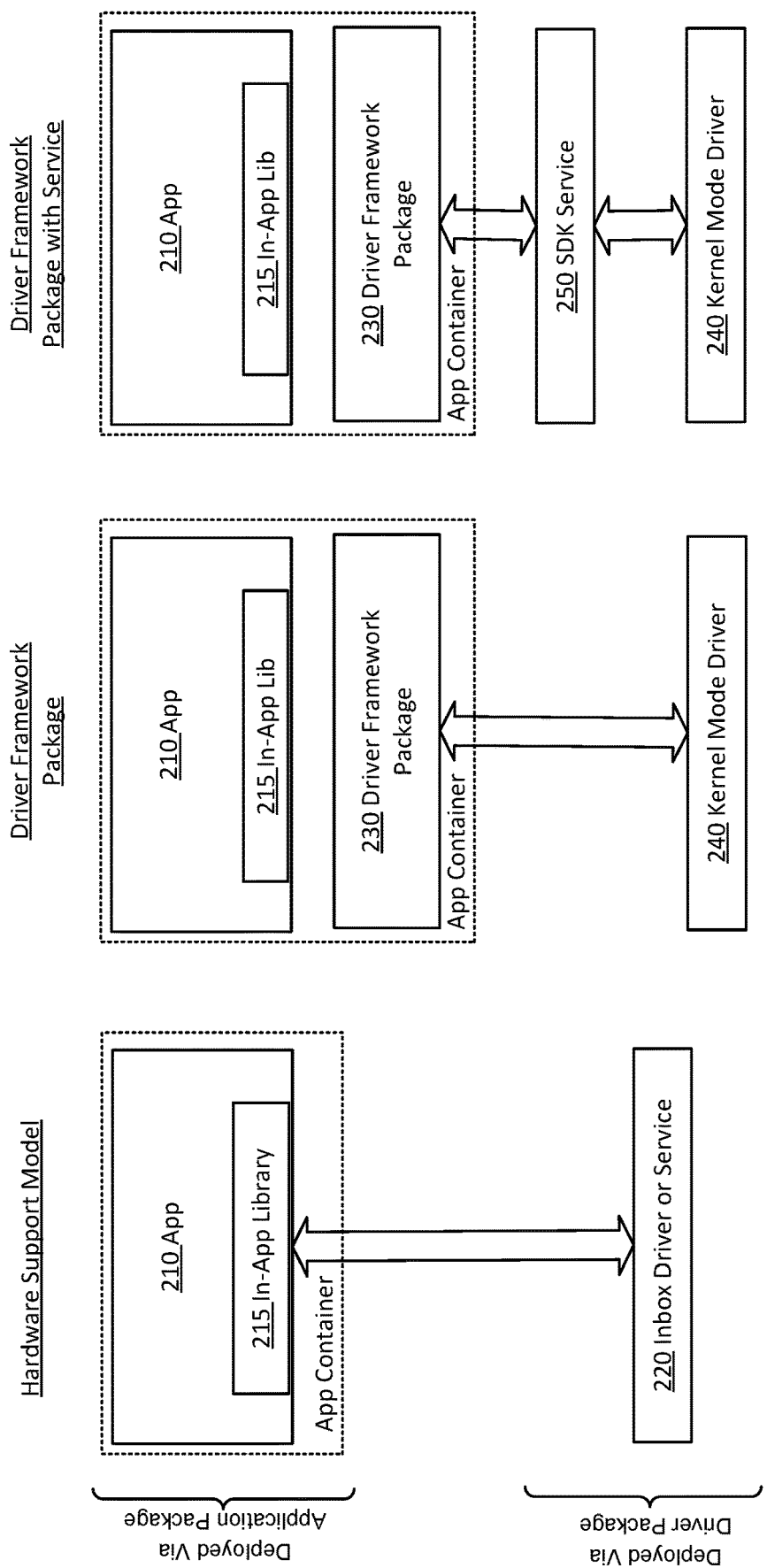
FIG. 2 is diagram that shows aspects of a driver framework package as disclosed herein.

Some SDKs enable hardware, while others provide code that is optimized for hardware, such as the GPU. SDKs may also have different architectures, with some SDKs communicating with services, and others communicating directly with the driver or indirectly via the operating system. These differences may influence how the SDKs are implemented, how they integrate with applications, how they are versioned, and how they are deployed. Some example architectures are illustrated in FIG. 2. In the hardware support model, the app and in-app library are fully store compliant. Communications from the app to driver may be performed directly using an API, and may require a custom capability. For the DFP only, the app and in-app library may be fully store compliant. The DFP loads into the app process, and it should be store compliant. Communications from the DFP is similar to the hardware support model, and needs a custom capability. For a DFP with service, the app and in-app library must be fully store compliant. The DFP loads into the app process, and it may be store compliant. Communications from the DFP is similar to the hardware support model and uses RPC.

Two core types of SDKs may be implemented. One type may be a hardware-enabling SDK, which exposes unique hardware capabilities to applications. For example, a hardware provider may expose APIs on a device via an SDK so that equipment manufacturers can build custom hardware support applications. A second type is a hardware-optimized SDK, which may typically be industry SDKs that a hardware provider has optimized for their hardware, for example the GPU. Multiple hardware providers may provide the same industry SDK for their own hardware, e.g., OpenCL.

Depending on the details of the SDK runtime binaries, they can communicate either directly with the driver, or indirectly via services deployed in the driver package or an operating system component that communicates with the driver. Communicating with system level components outside of the application process may provide useful capabilities and may be provided in a way that maintains the criteria as discussed herein.

For SDK runtimes that communicate with the driver, the runtimes may use an API for opening a custom device and declaring custom capabilities, for example as described in the docs.microsoft.com network. For applications that communicate with services through remote calls such as RPC, the applications can have an open connection or a restricted connection. In an open RPC communication, the hardware provider can open the RPC endpoint on their service and thus without access control list (ACL) restrictions. In this way, providers can use the SDK without engaging the hardware provider. In the case of restricted RPC communications, the hardware provider can modify the ACL to allow the RPC endpoint on the service with only access to applications that have declared the necessary custom capability. In some embodiments, applications can secure the RPC pipe with the custom capability.

In some embodiments, different extension mechanisms may be provided depending on how a hardware provider handles the code distribution and versioning of their runtime binaries and how tight a coupling there is between the runtimes and the driver. Applications can distribute SDK components directly in the platform application, or runtime binaries can be distributed in DFPs. In either case, the SDK runtime binaries may be distributed from the platform store.

Regardless of how an SDK is implemented, the following general requirements may be applied to platform SDKs:
1. SDK runtime binaries for platform applications may be compatible with the platform store and validated with a certification kit.
2. Applications may only load runtime binaries from within the applications package or a store framework package. Applications may not load DLLs from other sources such as ones deployed with the driver.
3. Driver components comply with driver development principles described herein.
4. API contracts exposed to applications by the hardware provider SDK are versioned, resilient, and backward compatible.
5. The SDK provides a reasonable fall back mechanism to account for the absence of a driver framework package or hardware on the system.

One type of hardware provider SDK is one for which the runtime binaries are directly included in applications. In this case the SDK is self-contained and doesn't have version dependencies with a driver. There may not be a mechanism to update the runtime binaries after an application has shipped and compatibility must be maintained in the driver.

With a driver framework package, the runtime binaries of the hardware provider SDK may be contained in an SDK tailored type of store package that may be referred to as a framework package (FXP). Additionally, a library may be provided that is bundled into the application. In this scenario, an in-app hardware provider SDK may update the runtime binaries as desired. The SDK may maintain the API contract with applications using the hardware provider SDK to maintain application compatibility.

In some embodiments, driver framework packages may be used when the runtime binaries are version-bound with the underlying driver package binaries. Delivering the SDK using a driver framework package may allow for the package to be updated in conjunction with the underlying driver package. The driver framework package may thus be used to allow hardware providers to expose hardware differentiated functionality to platform applications. Driver framework packages may allow hardware providers to couple SDK runtime binaries with their driver package and allow them to be serviced via the store.

The following general characteristics may be applied to driver framework packages:
1. DFP deployment may be triggered by the driver framework package when the driver is installed.
2. One version of a DFP may be installed on a system at any given time, and they may be version matched with the driver installed on the system
3. Runtime binaries distributed in DFPs should be validated.
4. Applications may be configured to handle the case of missing frameworks
5. DFPs may be configured so that they do not execute on their own. The runtime binaries may execute only in the context of a referencing application.
6. Updates may be tied to driver updates if the DFP is bound to a driver version A driver framework package may be developed by packaging and delivering system components such as the driver, and if applicable, a service, that are associated with the hardware provider SDK (drivers, services, etc.) as a DCHU compliant universal driver package. DCHU refers to a driver conforming to the following design principles: declarative, componentized, hardware support applications delivered from the store, and universal API compliance. The driver package and included binaries may conform to DCHU principles. The hardware provider may publish the driver package to a software update service so that it can be readily acquired and subsequently updated in the future.

In one embodiment, DFP installation from the store may be launched during the installation of the corresponding driver package. In the present disclosure, some example implementations are described in the context of the Windows Runtime (WinRT) application architecture and the Universal Windows Platform (UWP). The described principles may be applied to other architectures and platforms.

In one example implementation, the hardware provider may use the AddSoftware Type 2 directive in their driver package for this purpose. Other framework packages in the store (eg: VCLibs) may be downloaded during application install time if they are specified in the PackageDependency section in the APPX manifest. In addition, hardware providers will be able to provide a pre-install DFP package to the OEMs to install during production. In some embodiments, the download behavior of DFPs may be aligned to match other frameworks in the store and download during application install vs. driver install.

The hardware provider may then create a hardware provider SDK for framework applications. To expose the hardware provider hardware's differentiated functionality to UWP applications, a driver framework package may be created. This package may contain one or more SDK DLLs, or runtime binaries, which comprise the middleware that talks to the system software created above, a header file that exposes a set of high-level client-facing APIs for application developers to code against, and an import library that matches the header file that links to the SDK DLL. Both interfaces exposed by the DFP, those to the application and the driver package, may be verified.

Declaring a package in an application package format such as APPX as a driver framework package may be performed by specifying the framework element as TRUE within the AppxManifest of the DFP. In addition, DriverDependency may also be specified in the Appx Manifest. Since DFPs are optional, the application may delay loading the DFP to ensure that it loads in the scenario where DFP is not installed on the system.

When using a driver framework package in a UWP application, the installation of a driver framework package may trigger during driver installation and not at application install time. Providers may treat DFPs as an optional dependency for their application since they are bound to the driver package and as a result not guaranteed to be present on the user's system.

Driver framework packages may be declared in a UWP application's AppxManifest as another package dependency and the dependency type may be specified as optional. Access to system software using a DFP may be secured by a hardware provider owned capability (e.g., a custom capability). Prior to using the capability, a UWP application may declare it in its AppxManifest.

In an embodiment, automated onboarding validation may be used to ensure predetermined levels of sustained performance, security, and ability for devices to stay current.

A submission process for DFPs and applications that use them may be consistent with other store application submission processes. Additional validation may also be triggered.

The following rules may be applicable to hardware provider SDKs

1. SDK runtime binaries for UWP applications may be compatible with the store and validated with a certification kit.

2. The SDK should not interfere with a developer's ability to create a universal application that runs across all application system devices and architectures. For example, the DFP should set a target in the manifest.

3. Apps may only load runtime binaries from within the applications package or a driver framework package, and may not load DLLs from other sources such as ones deployed with the driver.

4. The DFP should be binary-stable and maintain backwards compatibility with published applications, even across updates to the driver or the DFP. API contracts exposed to applications by the hardware provider SDK should be versioned, resilient, and backward compatible to maintain application compatibility.

5. The privileged components of hardware provider extensions (drivers, services, etc.) should enforce the appropriate controls for accessing resources that impact the user's privacy or security or otherwise cause harm.

To enable universal applications to leverage SDKs, SDKs may be developed in such a way that developers can build universal applications that target all device families (e.g., for Windows-PC, Xbox, HoloLens, etc.) and all CPU architectures (e.g., x86, x64, ARM32, etc.) without significant workarounds. For example, developers should not have to use conditional coding techniques to avoid referencing an SDK from certain build targets. All targets should successfully build and all targets should successfully deploy, launch, and execute provided the developer uses the APIs correctly.

Once a DFP is published to the store, applications can take a dependency on that DFP and the providers need not update their applications in the future. This means that the DFP should continue to work in a backwards-compatible way indefinitely. Even if the underlying platform components (drivers, etc.) change in incompatible ways, the DFP should not break its contract with existing applications. The DFP might stop working in that the applications no longer have access to the underlying hardware or other software components, but it should still behave as originally documented (e.g., return well-known failure codes).

Updates to the DFP can add new features, provided they are added in a backwards-compatible way. DFPs may be versioned like other packages in the store, where version X may be assumed to be compatible with all clients of versions <=X. If a new DFP needs to be released that is not backwards-compatible with prior releases, a version update should not be used, and a new DFP with a new package family name may be released, which can exist side-by-side with the previous DFPs. For example, a DFP named "Contoso Widgets" might ship several compatible versions 1 through 5. The 6th release of the DFP is found to be incompatible with the previous ones, so a new DFP named "Contoso Widgets 2" may be released. "Contoso Widgets 2" may be wholly independent from (and versioned separately from) the original "Contoso Widgets" DFP, although to avoid confusion it may start at version 6. Each DFP may be reference-counted by the system and removed when no longer needed by any installed applications.

One of the features of a universal platform such as the UWP platform and the store is that installed applications cannot access their private data, make changes to their machine, access sensitive resources, or otherwise perform malicious or unwanted actions without user consent. This protection from potentially-malicious applications extends to 3rd-party system components as well.

3rd-party platform extensions that run outside the context of the AppContainer (drivers, services, external processes, etc.) may be protected by custom capabilities. Custom capabilities should not be allowed to provide access to security or privacy sensitive resources.

One way to expose platform functionality is via APIs. APIs may be available to programming languages including C++, C #, and JavaScript, and also supports C for certain types of SDKs.

The following may be considered when architecting the SDK and DFP:

1. The platform extensions such as drivers or services
2. The DFP components that communicate with the platform extensions
3. The SDK that wraps the DFP in a platform-neutral, architecture-neutral way
4. The application that uses the SDK to access the platform extensions The following example uses an example "toaster" platform extension that allows applications to make toast via a USB-connected toaster. This example includes a C # application consuming an SDK implemented in C++/CX, which in turn calls the DFP written in C++ and exposed via a flat API. The platform extension components are not illustrated, since there should be no static dependency between the DFP and the extensions—all communication should be via built-in features such as RPC.

To build the application, the Contoso.ToastLibrary APIs provided by the SDK can be used, and the DFP and the platform components need not be considered. Whether the DFP is installed, whether the correct drivers/driver versions are installed, and whether there's a physical toaster attached via USB, etc. are details that the SDK and DFP may determine.

Code similar to the following, using the "Is Supported?" API pattern defined below, can be used:

```
void ToastSomeBread( )
{
  // using namespace Contoso.ToastLibrary;
  // Can this machine toast at all?
  if (!Toaster.IsSupported( ))
    return;
  // Is there a toaster attached?
  var toaster = Toaster.GetDefault( );
  if (toaster == null)
    return;
  // Handle "popped up" event when toast is done
  toaster.PoppedUp += (sender, args) =>
  {
    Debug.WriteLine($"Your toast is {args.Doneness}");
  };
  // Toast some bread at 50% power
  toaster.StartToasting(BreadKind.Wheat, 0.5);
}
```

In this example, the APIs come from the Contoso.ToastLibrary namespace, which the application may access by referencing the Contoso.ToastLibrary.winmd file. The application may be coded as if it was calling any other built-in API and doesn't have to consider the DFP or the platform pieces.

The SDK may expose a public surface to application developers (in this example, via an API) and hide the implementation details of detecting the DFP and any underlying dependencies. The Contoso.ToastLibrary SDK components may be distributed as part of the application, and a clean, well-defined, versionable interface to the DFP components may be provided. The SDK DLL should be a relatively thin wrapper around the DFP, providing only enough additional functionality to produce the developer-friendly API.

In one example, the code for the Toaster.IsSupported( ) method may be implemented as follows:

```
std::once_flag initFlag_;
bool supported_;
bool Toaster::IsSupported( )
{
  std::call_once(initFlag_, [ ]
  {
    supported_ = false;
    auto result = QueryOptionalDelayLoadedAPI(GetThisModule( ),
      "DFP_Toaster.dll",
        "DFP_IsToastingSupported", 0);
    if (result == TRUE)
    {
      result = DFP_IsToastingSupported( );
      if (result == TRUE)
        supported_ = true;
    }
  });
  return supported_;
}
```

The SDK component may delay-load the DFP library so that the application doesn't consider it missing:

```
auto result = QueryOptionalDelayLoadedAPI(GetThisModule( ),
  "DFP_Toaster.dll",
    "DFP_IsToastingSupported", 0);
```

If the DFP_Toaster.dll file is found by the application (i.e., the framework package is deployed) and the DLL exposes the function DFP_IsToastingSupported and the function returns true, then this code will return true to the application. Otherwise, the code will return false. In this way, the application is isolated from considering why toasting isn't supported (wrong driver version; incorrect hardware architecture; etc.) and can treat all failures in the same way.

This code requires the SDK component to use the delay-load linker flag on the command-line:
  /DELAYLOAD: "DFP_Toaster.dll"

If /DELAYLOAD is not used (or you specify the wrong DLL name) the build will succeed but QueryOptionalDelayLoadedAPI will return FALSE at runtime. An alternate mechanism is to use LoadPackagedLibrary/GetProcAddress.

Other parts of the SDK are thin wrappers around the DFP, for example:

```
void Toaster::StartToasting(BreadKind breadKind, double powerPercentage)
{
  auto result = DFP_StartToasting(impl_->dfpToasterHandle,
    static_cast<int>(breadKind),
    static_cast<int>(ceil(powerPercentage * 10)),
    ToastCompleteCallbackWrapper,
    reinterpret_cast<void*>(this));
  if (result == FALSE)
    throw ref new Platform::InvalidArgumentException( );
}
```

This code shows how the SDK is a thin wrapper around the DFP APIs and provides services such as type conversions and interop between types (enums, objects, etc.) and the plain C types used by the DFP (raw pointers, handles, integers, etc.). In this case, the SDK doesn't need to use QueryOptionalDelayLoadedAPI for DFP_StartToasting because this code is unreachable if Toaster.IsSupported( ) returns false—Toaster.GetDefault( ) will return null, so there's no way to call an instance method on a Toaster object.

As can be seen from the code samples above, the IsSupported pattern can be used by applications to detect if a given feature is supported at all by the current machine. The check may be exposed via a static method (Toaster.IsSupported( )) and the implementation may rely on a global bool to cache the value, with the assumption being that IsSupported cannot change within the lifetime of the application.

If IsSupported returns false, it may be determined that the machine fundamentally cannot support the feature even if the user changes some software configuration or attaches a hardware peripheral. If IsSupported returns true, it may be determined that the machine can potentially support the feature (e.g., because the right drivers are installed) even if it can't necessarily do so right now (e.g., because the user needs to plug in a peripheral).

Applications need not all IsSupported before using the rest of the SDK, since typically, even if the feature is supported by the system, hardware or other resources might be missing at runtime. IsSupported is intended to let applications optionally tailor their UX to remove certain options (such as menus, buttons, etc.) if a feature is impossible to use.

Recalling the sample application code from above:

```
// Can this machine toast at all?
if (!Toaster.IsSupported( ))
    return;
// Is there a toaster attached?
var toaster = Toaster.GetDefault( );
if (toaster == null)
    return;
```

Even if the call to Toaster.IsSupported( ) is removed, this application code is applicable because Toaster.GetDefault( ) will return null if there are no USB toasters available currently—and it is true that no toasters are available if the user hasn't installed the driver /DFP yet.

If the DFP is only supported on specific architectures (e.g., x86 and x64) the SDK components can be simplified by compiling out the actual runtime checks for IsSupported( ) and having empty implementations of all the other methods:

```
bool Toaster::IsSupported( )
{
#if !(defined(__X86__) || defined(__AMD64__))
    return false;
#else
    // Real code from above...
    return supported_;
#endif
}
```

The client application may call the same code on all architectures, and their code may be applicable regardless of the architecture or whether the toaster driver is present, etc.

The DFP components may integrate with the platform extensions to provide the bulk of the functionality exposed via the SDK. In some cases, the DFP might be a thin wrapper around RPC or IOCTLs (or might be missing entirely) but in many cases will layer over the top of the platform components may be provided to enable, for example, state isolation between applications, minimizing the amount of code that runs elevated, etc.

DFP binaries may be linked via delay-loads or use LoadPackagedLibrary to load DFP binaries at runtime, the boundary between the DFP and the platform extensions should be based on platform APIs such as RPC, DeviceIOControl, or the APIs in the Windows.Devices namespace.

A desktop bridge package may be provided that can declare package dependency on framework packages. In order to ensure that the SDK DLL works for UWP and other packages, the DLL should:
1. use only UWP compliant public APIs
2. verify that the functionality exposed by the DLL works when loaded for all cases—on UWP and other processes.

Previously, hardware providers may access hardware from desktop applications by opening a handle to the hardware device using CreateFile, and then use DeviceIoControl to interface with it. An API may be provided (CreateFileFromApp) that allows hardware providers to port code that uses CreateFile & DeviceIoControl with little modification, and obtain a device handle from within an application container by brokering it using Device Access Broker (similar to Windows.Devices.Custom).

Hardware providers may set device capability properties on the device interface. Using an SCCD, UWP applications may open a handle to the interface using CreateFileFromApp.

A Secure Custom Capability Descriptor (SCCD) file may be used to grant access to specified UWP applications to an endpoint, a driver, or NT Service. Hardware providers may create and distribute an open access SCCD (not bound to a specific App page frame number (PFN)) that can be made available to any provider using the hardware provider's SDK. Providers may include the SCCD in the APPX package root.

DFP exports to UWP applications may be considered store compliant. A list of framework binaries (DFPs) may be managed in a separate XML that may be managed in the cloud. Once added, the store compliance test may ignore exports from those binaries it's evaluating UWP application compliance. Since the "Supported framework XML" file is maintained in the cloud, it may be synced automatically when the Store or the developer runs the store compliance on an APPX.

Figure 4:
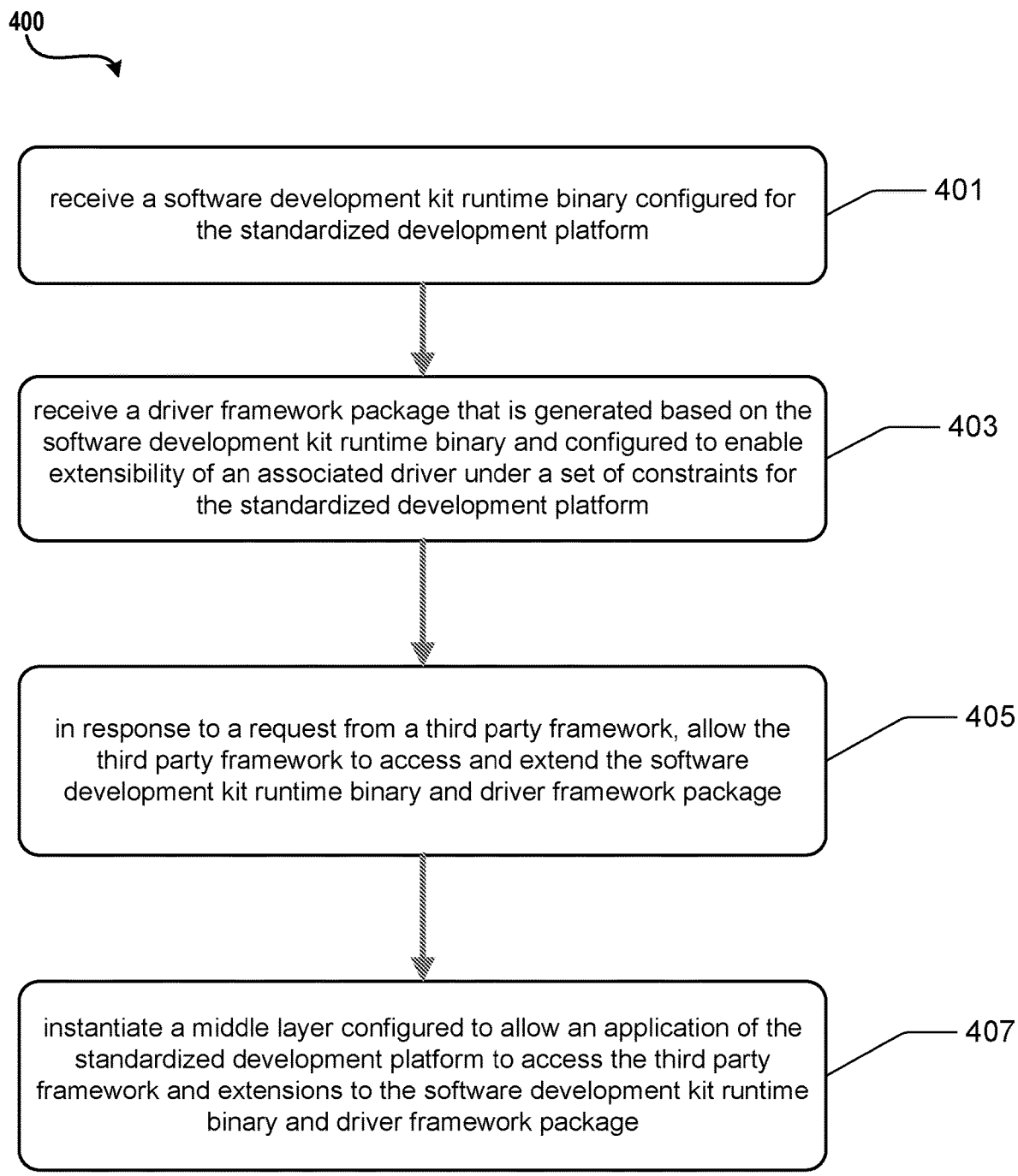
FIG. 4 is a flow diagram illustrating an example procedure in accordance with the present disclosure.

FIG. 4 illustrates aspects of a routine 400 for enabling aspects of the techniques disclosed herein as shown and described below. It should be understood that the operations of the methods disclosed herein are not presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routine 400 are described herein as being implemented, at least in part, by modules running the features disclosed herein and can be a dynamically linked library (DLL), a statically linked library, functionality produced by an application programming interface (API), a compiled program, an interpreted program, a script or any other executable set of instructions. Data can be stored in a data structure in one or more memory components. Data can be retrieved from the data structure by addressing links or references to the data structure.

Although the following illustration refers to the components of the figures, it can be appreciated that the operations of the routine 400 may be also implemented in many other ways. For example, the routine 400 may be implemented, at least in part, by a processor of another remote computer or a local circuit. In addition, one or more of the operations of the routine 400 may alternatively or additionally be implemented, at least in part, by a chipset working alone or in conjunction with other software modules. In the example described below, one or more modules of a computing system can receive and/or process the data disclosed herein. Any service, circuit or application suitable for providing the techniques disclosed herein can be used in operations described herein.

Figure 5:
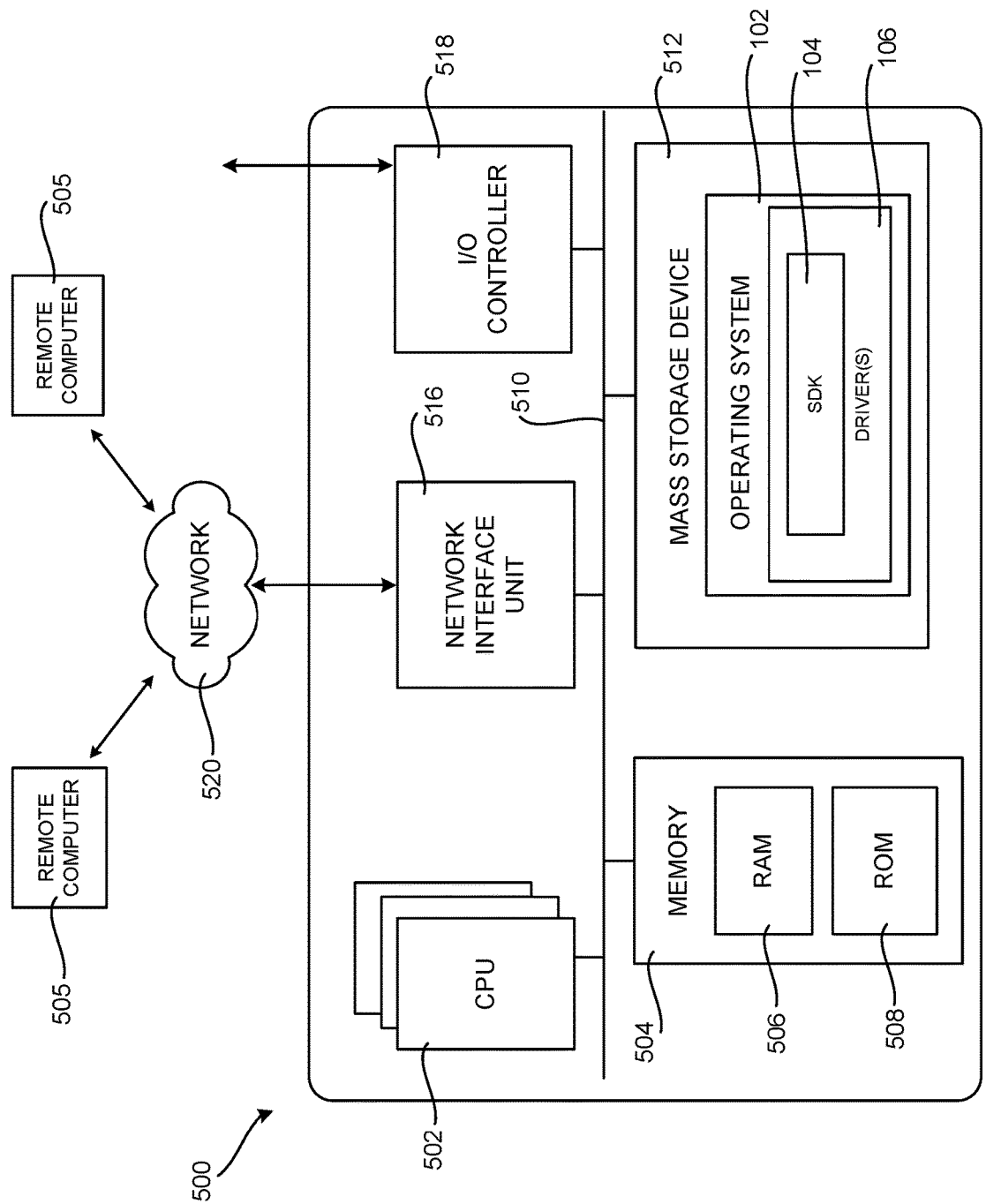
FIG. 5 is a computer architecture diagram showing an illustrative computer hardware and software architecture for a computing device that can execute the driver module framework and associated modules, such as those described with regard to FIGS. 1-4.

The operations in FIG. 4 can be performed, for example, by the computing device 500 of FIG. 5, as described above with respect to any one of FIGS. 1-3.

At operation 401, a software development kit runtime binary is received that is configured for the standardized development platform.

At operation 403, a driver framework package is received that is generated based on the software development kit runtime binary and configured to enable extensibility of an associated driver under a set of constraints for the standardized development platform.

At operation 405, in response to a request from a third party framework, the third party framework is allowed to access and extend the software development kit runtime binary and driver framework package.

At operation 407, a middle layer is instantiated that is configured to allow an application of the standardized development platform to access the third party framework and extensions to the software development kit runtime binary and driver framework package.

FIG. 5 is a computer architecture diagram showing an illustrative computer hardware and software architecture for a computing device that can execute various aspects of the present disclosure, such as those described above with regard to FIGS. 1-4, according to one implementation. In particular, the architecture illustrated in FIG. 5 can be utilized to implement a server computer, a desktop computer, a laptop computer, or another type of computing device.

The computer 500 illustrated in FIG. 5 includes a central processing unit 502 ("CPU" or "processor"), a system memory 504, including a random-access memory 506 ("RAM") and a read-only memory ("ROM") 508, and a system bus 510 that couples the memory 504 to the CPU 502. A basic input/output system ("BIOS" or "firmware") containing the basic routines that help to transfer information between elements within the computer 500, such as during startup, can be stored in the ROM 508. The computer 500 further includes a mass storage device 512 for storing an operating system 102, the SDK 104, drivers 106, application programs, and other types of programs. The mass storage device 512 can also be configured to store other types of programs and data.

The mass storage device 512 is connected to the CPU 502 through a mass storage controller (not shown in FIG. 6) connected to the bus 510. The mass storage device 512 and its associated computer readable media provide non-volatile storage for the computer 500. Although the description of computer readable media contained herein refers to a mass storage device, such as a hard disk, CD-ROM drive, DVD-ROM drive, or USB storage key, it should be appreciated by those skilled in the art that computer readable media can be any available computer storage media or communication media that can be accessed by the computer 500.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, radio frequency, infrared and other wireless media. Combinations of the any of the above should also be included within the scope of computer readable media.

By way of example, and not limitation, computer storage media can include volatile and non-volatile, removable and non-removable media implemented in any method or technology for storage of information such as computer readable instructions, data structures, program modules or other data. For example, computer storage media includes, but is not limited to, RAM, ROM, EPROM, EEPROM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other computer storage medium that can be used to store the desired information and which can be accessed by the computer 500. For purposes of the claims, the phrase "computer storage medium," and variations thereof, does not include waves or signals per se or communication media.

According to various configurations, the computer 500 can operate in a networked environment using logical connections to remote computers through a network such as the network 520. The computer 500 can connect to the network 520 through a network interface unit 516 connected to the bus 510. It should be appreciated that the network interface unit 516 can also be utilized to connect to other types of networks and remote computer systems. The computer 500 can also include an input/output controller 518 for receiving and processing input from a number of other devices, including a keyboard, mouse, touch input, an electronic stylus (not shown in FIG. 5), or a physical sensor such as a video camera. Similarly, the input/output controller 518 can provide output to a display screen or other type of output device (also not shown in FIG. 5).

It should be appreciated that the software components described herein, when loaded into the CPU 502 and executed, can transform the CPU 502 and the overall computer 500 from a general-purpose computing device into a special-purpose computing device customized to facilitate the functionality presented herein. The CPU 502 can be constructed from any number of transistors or other discrete circuit elements, which can individually or collectively assume any number of states. More specifically, the CPU 502 can operate as a finite-state machine, in response to executable instructions contained within the software modules disclosed herein. These computer-executable instructions can transform the CPU 502 by specifying how the CPU 502 transitions between states, thereby transforming the transistors or other discrete hardware elements constituting the CPU 502.

Encoding the software modules presented herein can also transform the physical structure of the computer readable media presented herein. The specific transformation of physical structure depends on various factors, in different implementations of this description. Examples of such factors include, but are not limited to, the technology used to implement the computer readable media, whether the computer readable media is characterized as primary or secondary storage, and the like. For example, if the computer readable media is implemented as semiconductor-based memory, the software disclosed herein can be encoded on the computer readable media by transforming the physical state of the semiconductor memory. For instance, the software can transform the state of transistors, capacitors, or other discrete circuit elements constituting the semiconductor memory. The software can also transform the physical state of such components in order to store data thereupon.

As another example, the computer readable media disclosed herein can be implemented using magnetic or optical technology. In such implementations, the software presented herein can transform the physical state of magnetic or optical media, when the software is encoded therein. These transformations can include altering the magnetic characteristics of particular locations within given magnetic media. These transformations can also include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer 500 in order to store and execute the software components presented herein. It also should be appreciated that the architecture shown in FIG. 5 for the computer 500, or a similar architecture, can be utilized to implement other types of computing devices, including hand-held computers, video game devices, embedded computer systems, mobile devices such as smartphones, tablets, and AR/VR devices, and other types of computing devices known to those skilled in the art. It is also contemplated that the computer 500 might not include all of the components shown in FIG. 5, can include other components that are not explicitly shown in FIG. 5, or can utilize an architecture completely different than that shown in FIG. 5.

Figure 6:
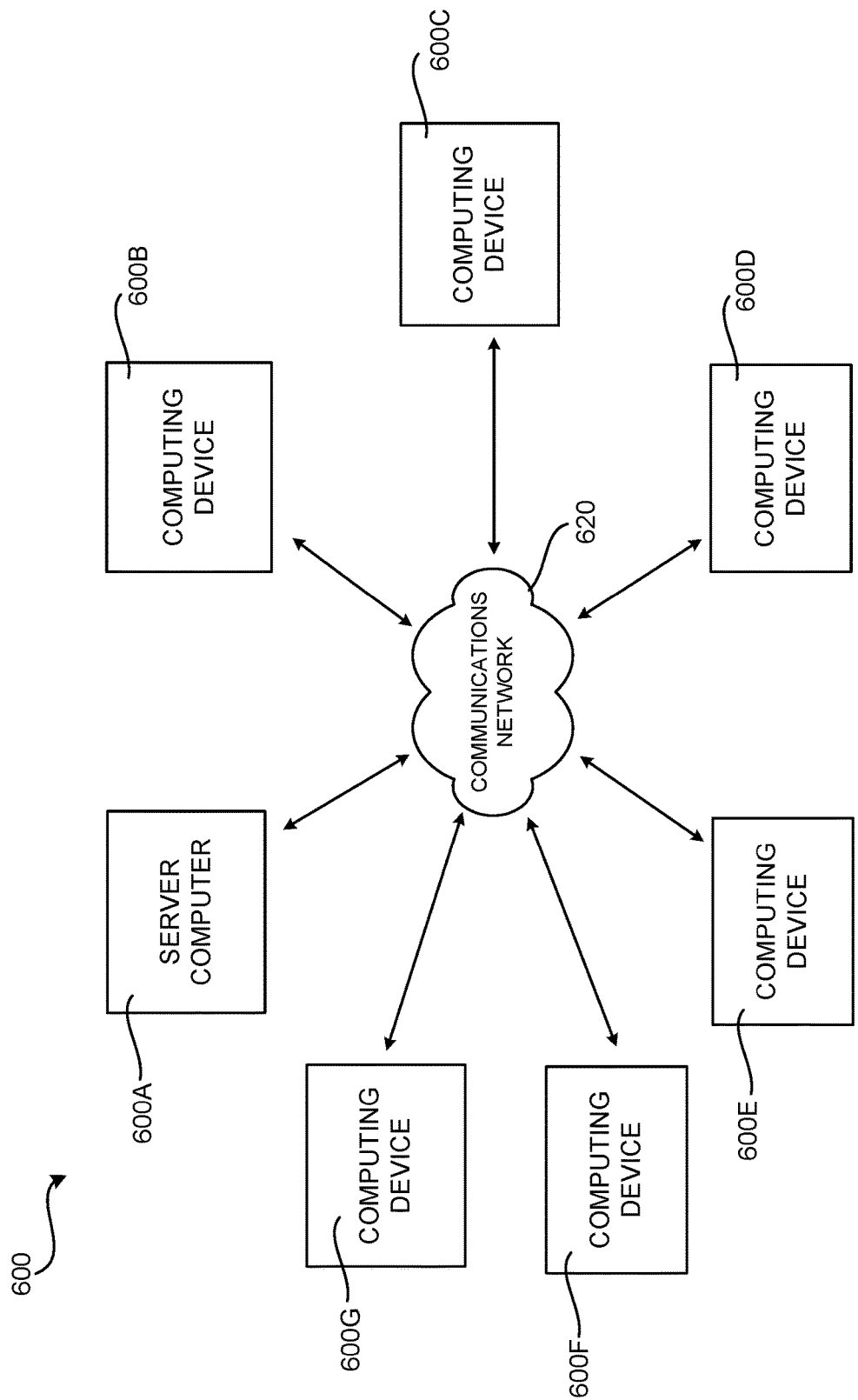
FIG. 6 is a network diagram illustrating a distributed computing environment in which aspects of the disclosed technologies can be implemented.

FIG. 6 is a network diagram illustrating a distributed network computing environment 600 in which aspects of the disclosed technologies can be implemented, according to various implementations presented herein. As shown in FIG. 6, one or more server computers 600A can be interconnected via a communications network 620 (which may be either of, or a combination of, a fixed-wire or wireless LAN, WAN, intranet, extranet, peer-to-peer network, virtual private network, the Internet, Bluetooth communications network, proprietary low voltage communications network, or other communications network) with a number of client computing devices such as, but not limited to, a tablet computer 600B, a gaming console 600C, a smart watch 600D, a telephone 600E, such as a smartphone, a personal computer 600F, and an AR/VR device 600G.

In a network environment in which the communications network 620 is the Internet, for example, the server computer 600A can be a dedicated server computer operable to process and communicate data to and from the client computing devices 600B-600G via any of a number of known protocols, such as, hypertext transfer protocol ("HTTP"), file transfer protocol ("FTP"), or simple object access protocol ("SOAP"). Additionally, the networked computing environment 600 can utilize various data security protocols such as secured socket layer ("SSL") or pretty good privacy ("PGP"). Each of the client computing devices 600B-600G can be equipped with an operating system operable to support one or more computing applications or terminal sessions such as a web browser (not shown in FIG. 5), or other graphical user interface (not shown in FIG. 5), or a mobile desktop environment (not shown in FIG. 6) to gain access to the server computer 600A.

The server computer 600A can be communicatively coupled to other computing environments (not shown in FIG. 6) and receive data regarding a participating user's interactions/resource network. In an illustrative operation, a user (not shown in FIG. 6) may interact with a computing application running on a client computing device 600B-600G to obtain desired data and/or perform other computing applications.

The data and/or computing applications may be stored on the server 600A, or servers 600A, and communicated to cooperating users through the client computing devices 600B-600G over an exemplary communications network 620. A participating user (not shown in FIG. 6) may request access to specific data and applications housed in whole or in part on the server computer 600A. These data may be communicated between the client computing devices 600B-600G and the server computer 600A for processing and storage.

The server computer 600A can host computing applications, processes and applets for the generation, authentication, encryption, and communication of data and applications, and may cooperate with other server computing environments (not shown in FIG. 6), third party service providers (not shown in FIG. 6), network attached storage ("NAS") and storage area networks ("SAN") to realize application/data transactions.

It should be appreciated that the computing architecture shown in FIG. 5 and the distributed network computing environment shown in FIG. 6 have been simplified for ease of discussion. It should also be appreciated that the computing architecture and the distributed computing network can include and utilize many more computing components, devices, software programs, networking devices, and other components not specifically described herein.

Based on the foregoing, it should be appreciated that a framework has been disclosed that enables the creation and execution of reliable and performant drivers and applications and associated SDKs. Although the subject matter presented herein has been described in language specific to computer structural features, methodological and transformative acts, specific computing machinery, and computer readable media, it is to be understood that the subject matter set forth in the appended claims is not necessarily limited to the specific features, acts, or media described herein. Rather, the specific features, acts and mediums are disclosed as example forms of implementing the claimed subject matter.

EXAMPLE CLAUSES

The disclosure presented herein may be considered in view of the following clauses.

Example Clause A, a device comprising:
one or more processors;
a memory in communication with the one or more processors, the memory having computer-readable instructions stored thereupon which, when executed by the one or more processors, cause the device to instantiate a platform configured to:
receive a software development kit runtime binary configured for the standardized development platform;
receive a driver framework package that is generated based on the software development kit runtime binary and configured to enable extensibility of an associated driver under a set of constraints for the standardized development platform;
in response to a request from a third party framework, allow the third party framework to access and extend the software development kit runtime binary and driver framework package; and
instantiate a middle layer configured to allow an application of the standardized development platform to access the third party framework and extensions to the software development kit runtime binary and driver framework package.

Example Clause B, the device of Example Clause A, wherein the standardized development platform is further configured to instantiate an interface operable to receive one or more applications that conform to the driver framework package.

Example Clause C, the device of any one of Example Clauses A through B, wherein the standardized development platform implements one or more standard interfaces for development of applications.

Example Clause D, the device of any one of Example Clauses A through C, wherein the platform is further configured to instantiate a repository for distributing the software development kit runtime binaries.

Example Clause E, the device of any one of Example Clauses A through D, wherein the driver framework package is delivered via the repository.

Example Clause F, the device of any one of Example Clauses A through D, wherein the applications are run in a container that enforce adherence to a set of constraints.

Example Clause G, the device of any one of Example Clauses A through F, further comprising computer-readable instructions stored thereupon which, when executed by the one or more processors, cause the device to publish the software development kit runtime binaries and allow applications to declare the software development kit runtime binaries as dependencies.

Example Clause H, the device of any one of Example Clauses A through G, wherein the middle layer is configured to expose interfaces to the software development kit runtime binaries and first party frameworks.

Example Clause I, the device of any one of Example Clauses A through G, wherein installation of the driver framework package is triggered during driver installation.

Example Clause J, the device of any one of Example Clauses A through I, wherein the interfaces are implemented as application programming interfaces (APIs).

While Example Clauses A through J are described above with respect to a device, it is understood in the context of this disclosure that the subject matter of Example Clauses A through J can additionally or alternatively be implemented as a method or via computer readable storage media.

Example Clause K, a method comprising:
receiving a software development kit runtime binary configured for a standardized platform;
receive a driver framework package that is generated based on the software development kit and configured to enable extensibility under a set of constraints;
communicate with a third party framework and enable the third party framework to access the software development kit runtime binary and driver framework package; and
allow applications of the standardized platform to access the third party framework.

Example Clause L, the computing device of Example Clause K, further comprising instantiating a platform configured to instantiate an interface operable to receive one or more applications that conform to the driver framework package.

Example Clause M the computing device of Example Clause K or Example Clause L, wherein the standardized platform implements one or more standard interfaces for development of applications.

Example Clause N, the computing device of Example Clauses K through Example Clause M, further comprising instantiating a platform configured to: instantiate a repository for distributing the software development kit runtime binaries.

Example Clause O, the computing device of Example Clauses K through Example Clause N, wherein the driver framework package is delivered via the repository Example Clause P, the computing device of Example Clauses K through Example Clause O, wherein the applications are run in a container that enforce adherence to a set of constraints.

Example Clause Q, the computing device of Example Clauses K through Example Clause P, further comprising publishing the software development kit runtime binaries and allowing applications to declare the software development kit runtime binaries as dependencies.

Example Clause R, the computing device of Example Clauses K through Example Clause Q, wherein the repository implements a middle layer that is configured to expose interfaces to the software development kit runtime binaries and first party frameworks While Example Clauses K through R are described above with respect to a method, it is understood in the context of this disclosure that the subject matter of Example Clauses K through R can additionally or alternatively be implemented by a device or via computer readable storage media.

Example Clause S, a computer-readable storage medium comprising instructions that, when executed by a computing device, cause the computing device to perform operations comprising:
receiving a software development kit runtime binary configured for a standardized platform;
receive a driver framework package that is generated based on the software development kit and configured to enable extensibility under a set of constraints; and
enable access by third party frameworks to the software development kit runtime binaries and driver framework package.

Example Clause T, the device of Example Clause S, further comprising instructions that, when executed by a computing device, cause the computing device to perform operations comprising: instantiating a fourth interface operable to receive one or more applications that conform to the driver framework package.

While Example Clauses S through T are described above with respect to a computer-readable storage medium, it is understood in the context of this disclosure that the subject matter of Example Clauses S through T can additionally or alternatively be implemented as a device or method.

What is claimed is:

1. A device comprising:
one or more processors;
a memory in communication with the one or more processors, the memory having computer-readable instructions stored thereupon which, when executed by the one or more processors, cause the device to instantiate a standardized development platform configured to:
receive a software development kit runtime binary configured for the standardized development platform;
receive a driver framework package that is generated based on the software development kit runtime binary and configured to enable extensibility of an associated driver under a set of constraints for the standardized development platform;
in response to a request from a third party framework, allow the third party framework to access and extend the software development kit runtime binary and driver framework package; and
instantiate a middle layer configured to allow an application of the standardized development platform to access the third party framework and extensions to the software development kit runtime binary and driver framework package.

2. The device of claim 1, wherein the standardized development platform is further configured to instantiate an interface operable to receive one or more applications that conform to the driver framework package.

3. The device of claim 1, wherein the standardized development platform implements one or more standard interfaces for development of applications.

4. The device of claim 1, wherein the platform is further configured to instantiate a repository for distributing the software development kit runtime binaries.

5. The device of claim 4, wherein the driver framework package is delivered via the repository.

6. The device of claim 1, further comprising computer-readable instructions stored thereupon which, when executed by the one or more processors, cause the device to publish the software development kit runtime binaries and allow applications to declare the software development kit runtime binaries as dependencies.

7. The device of claim 1, wherein the middle layer is configured to expose interfaces to the software development kit runtime binaries and first party frameworks.

8. The device of claim 1, wherein installation of the driver framework package is triggered during driver installation.

9. The device of claim 1, wherein the interfaces are implemented as application programming interfaces (APIs).

10. The device of claim 1, wherein the set of constraints includes at least one of security, performance, or reliability of the associated driver.

11. A method comprising:
receiving a software development kit runtime binary configured for a standardized platform;
receiving a driver framework package that is generated based on the software development kit and configured to enable extensibility under a set of constraints;
communicating with a third party framework and enable the third party framework to access the software development kit runtime binary and driver framework package; and
allowing applications of the standardized platform to access the third party framework.

12. The method of claim 11, further comprising instantiating a platform configured to instantiate an interface operable to receive one or more applications that conform to the driver framework package.

13. The method of claim 11, wherein the standardized platform implements one or more standard interfaces for development of applications.

14. The method of claim 11, further comprising instantiating a platform configured to: instantiate a repository for distributing the software development kit runtime binaries.

15. The method of claim 14, wherein the driver framework package is delivered via the repository.

16. The method of claim 11, wherein the applications are run in a container that enforce adherence to a set of constraints.

17. The method of claim 11, further comprising publishing the software development kit runtime binaries and allowing applications to declare the software development kit runtime binaries as dependencies.

18. The method of claim 14, wherein the repository implements a middle layer that is configured to expose interfaces to the software development kit runtime binaries and first party frameworks.

19. A computer-readable storage medium comprising instructions that, when executed by a computing device, cause the computing device to perform operations comprising:
receiving a software development kit runtime binary configured for a standardized platform;
receiving a driver framework package that is generated based on the software development kit and configured to enable extensibility under a set of constraints; and
enabling access by third party frameworks to the software development kit runtime binaries and driver framework package.

20. The computer-readable storage medium of claim 19, further comprising instructions that, when executed by a computing device, cause the computing device to perform operations comprising: instantiating a fourth interface operable to receive one or more applications that conform to the driver framework package.

* * * * *